(12) United States Patent
Liao

(10) Patent No.: US 9,521,402 B2
(45) Date of Patent: Dec. 13, 2016

(54) STEREOSCOPIC DISPLAY DEVICE AND MANUFACTURING METHOD THEREOF

(71) Applicant: Shenzhen China Star Optoelectronics Technology Co., Ltd., Shenzhen, Guangdong (CN)

(72) Inventor: Qiaosheng Liao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 300 days.

(21) Appl. No.: 14/386,787

(22) PCT Filed: Aug. 22, 2014

(86) PCT No.: PCT/CN2014/085009
§ 371 (c)(1),
(2) Date: Sep. 19, 2014

(87) PCT Pub. No.: WO2016/026136
PCT Pub. Date: Feb. 25, 2016

(65) Prior Publication Data
US 2016/0249042 A1 Aug. 25, 2016

(30) Foreign Application Priority Data
Aug. 18, 2014 (CN) .......................... 2014 1 0407254

(51) Int. Cl.
*H04N 13/04* (2006.01)
*G02F 1/1335* (2006.01)
*G02B 27/22* (2006.01)

(52) U.S. Cl.
CPC .......... *H04N 13/0404* (2013.01); *G02B 27/22* (2013.01); *G02F 1/1335* (2013.01); *H04N 13/04* (2013.01); *H04N 13/0486* (2013.01)

(58) Field of Classification Search
CPC ........................ H04N 13/0486; H04N 13/0404
See application file for complete search history.

(56) References Cited

U.S. PATENT DOCUMENTS

| 8,436,953 B2 * | 5/2013 | Sakamoto .......... G02B 27/2214 349/145 |
| 2005/0225502 A1 * | 10/2005 | Nam .................. H04N 13/0409 345/55 |

(Continued)

*Primary Examiner* — Neil Mikeska
(74) *Attorney, Agent, or Firm* — Andrew C. Cheng

(57) ABSTRACT

The present invention discloses a stereoscopic display device and a manufacturing method thereof, which comprises: the display panel comprises a first row sub-pixel and a second row sub-pixel adjacently disposed in the column direction, the display control unit acquires a plurality of viewpoint images and divides the plurality viewpoint images into a first group viewpoint image and a second group viewpoint image, the display control unit further controls the first row sub-pixel to periodically display the content of each viewpoint image in the first group viewpoint image, and controls the second row sub-pixel to periodically display the content of each viewpoint image in the second group viewpoint image; the grating lens comprises a first row lens unit and a second row lens unit adjacently disposed in the column direction, which respectively cover on the first row sub-pixel and the second sub-pixel, the lens unit of the first row lens unit and the lens unit of the second row lens unit are staggered from each other along the row direction, and the staggered amount is less than one sub-pixel cycle, which can eliminate the moiré and can solve the crosstalk between each adjacent pixel unit. Through the above way, the present invention can eliminate the moiré and can solve the crosstalk between each adjacent pixel unit.

15 Claims, 4 Drawing Sheets

(56) References Cited

U.S. PATENT DOCUMENTS

| | | | | |
|---|---|---|---|---|
| 2006/0012542 | A1* | 1/2006 | Alden | G02B 27/2214 345/32 |
| 2010/0225792 | A1* | 9/2010 | Kumagai | H01L 27/14627 348/273 |
| 2014/0184660 | A1* | 7/2014 | Fujino | G09G 3/3655 345/690 |
| 2014/0285884 | A1* | 9/2014 | Raymond | G02B 3/005 359/463 |
| 2015/0102442 | A1* | 4/2015 | Ootsuka | H04N 5/23212 257/432 |
| 2015/0381971 | A1* | 12/2015 | Wu | G02B 27/2214 348/54 |

* cited by examiner

STEREOSCOPIC DISPLAY DEVICE AND MANUFACTURING METHOD THEREOF

BACKGROUND OF THE INVENTION

1. Field of the Invention

The present invention relates to the portable electronic device field, and in particular to a stereoscopic display device and a manufacturing method thereof.

2. The Related Arts

Currently, the display technology is developed from 2D display to 3D display. The existing naked eye stereoscopic display device mainly developed based on visual disparity, the main principle is to respectively guide the two images having a parallax to the left and right eyes of the observer through the lens array or the parallax barrier, in order to make the observer feel the stereoscopic effect. The current naked 3D display technology can be achieved by the parallax barrier, the lenticular lens or the directional backlight. The stereoscopic display device in the prior art commonly uses the lenticular lens array, in order to solve the issue of uneven brightness distribution, making the observer observe the images of brightness uniform distribution.

FIG. 1 is a structure diagram of the stereoscopic display device in the prior art, as shown in FIG. 1, taking 8 viewpoint for example, a grating lens comprises 8 lens unit periodically arranged in the row direction; therefore, the resolution in the row direction is seriously sacrificed, it is only ⅛ of original, because the arrangement of the grating lens and the display panel pixel has the high frequency similarity; namely, the black matrix of the grating lens group and the display panel has the equal periodic structure, making it easy to form a beat and produce a moiré. Therefore, in the design of the stereoscopic display device, avoiding the generation of the moiré becomes the primary consideration of the structure design.

SUMMARY OF THE INVENTION

The technical problems to be solved in the present invention are to provide a stereoscopic display device and a manufacturing method thereof, which can eliminate the moiré and can solve the crosstalk between each adjacent pixel unit.

In order to solve the above technical problems, the present invention provides a stereoscopic display device, which comprises:

A display panel, the display panel comprising a first row sub-pixel and a second row sub-pixel adjacently disposed in the column direction, the first row sub-pixel and the second row sub-pixel respectively comprising a plurality of sub-pixels periodically arranged along the row direction;

A display control unit, the display control unit acquiring a plurality of viewpoint images, and the plurality of viewpoint images viewpoint image being divided into a first group of viewpoint image and a second group of viewpoint image, the display control unit further controlling the first row sub-pixel to display the contents of each viewpoint image in the first group of viewpoint image, and controlling the second row sub-pixel to display the contents of each viewpoint image in the second group of viewpoint image;

A grating lens, the grating lens comprising a first row lens unit and a second row lens unit adjacently disposed in the column direction, the first row lens unit and the second row lens unit respectively comprising a plurality of lens units periodically arranged along the row direction, the first row lens unit covering on the first row sub-pixel, and the arranging cycle of the lens unit in the first row lens unit being in accordance with the display cycle of the first row sub-pixel, the second row lens unit covering on the second row sub-pixel, and the arranging cycle of the lens unit in the second row lens unit being in accordance with the display cycle of the second row sub-pixel, wherein the lens unit of the first row lens unit and the lens unit of the second row lens unit are staggered from each other along the row direction, and the staggered amount is less than one sub-pixel cycle;

Wherein the lens unit of first row lens unit and the lens unit of the second row lens unit are staggered a half cycle of the sub-pixel from each other along the row direction; the gating lens is a liquid crystal lens, and comprising a plurality of driving electrodes periodically arranged in the row direction, each driving electrode comprises a first sub-electrode extending along the column direction and corresponding to the lens unit of the first row lens unit, a second sub-electrode extending along the column direction and corresponding to the lens unit of the second row lens unit, and a third sub-electrode connecting with the adjacent end of the first sub-electrode and the second sub-electrode along the row direction, wherein the first sub-electrode and the second sub-electrode of the same driving electrode are staggered from each other along the row direction, and the staggered amount is less than one sub-pixel cycle.

Wherein the outer edge of the lens unit of the first row lens unit is located directly above the center line of the sub-pixel of the first row sub-pixel, the outer edge of the lens unit of the second row lens unit is located directly above the center line of a interval region between the two adjacent sub-pixels of the second row sub-pixel.

Wherein the display control unit acquires 2N viewpoint images, the first group of the viewpoint images and the second group of the viewpoint images respectively comprise N viewpoint images, N is a positive integer equal to or greater than 2.

Wherein the grating lens further comprises a first black matrix, the first black matrix is disposed on the boundary line between the first row lens unit and the second row lens unit along the row direction, in order to avoid the first group viewpoint image and the second group viewpoint image having the crosstalk along the column direction of the first row lens unit and the second lens unit.

Wherein the display panel further comprises a second black matrix, the second black matrix is disposed on the boundary line between the first row sub-pixel and the second row sub-pixel along the row direction, the first black matrix and the second black matrix overlap each other.

In order to solve the above technical problems, the present invention provides a stereoscopic display device, which comprises:

A display panel, the display panel comprising a first row sub-pixel and a second row sub-pixel adjacently disposed in the column direction, the first row sub-pixel and the second row sub-pixel respectively comprising a plurality of sub-pixels periodically arranged along the row direction;

A display control unit, the display control unit acquiring a plurality of viewpoint images, and the plurality of viewpoint images viewpoint image being divided into a first group of viewpoint image and a second group of viewpoint image, the display control unit further controlling the first row sub-pixel to display the contents of each viewpoint image in the first group of viewpoint image, and controlling the second row sub-pixel to display the contents of each viewpoint image in the second group of viewpoint image;

A grating lens, the grating lens comprising a first row lens unit and a second row lens unit adjacently disposed in the column direction, the first row lens unit and the second row lens unit respectively comprising a plurality of lens units periodically arranged along the row direction, the first row lens unit covering on the first row sub-pixel, and the arranging cycle of the lens unit in the first row lens unit being in accordance with the display cycle of the first row sub-pixel, the second row lens unit covering on the second row sub-pixel, and the arranging cycle of the lens unit in the second row lens unit being in accordance with the display cycle of the second row sub-pixel, wherein the lens unit of the first row lens unit and the lens unit of the second row lens unit are staggered from each other along the row direction, and the staggered amount is less than one sub-pixel cycle.

Wherein the lens unit of first row lens unit and the lens unit of the second row lens unit are staggered a half cycle of the sub-pixel from each other along the row direction.

Wherein the outer edge of the lens unit of the first row lens unit is located directly above the center line of the sub-pixel of the first row sub-pixel, the outer edge of the lens unit of the second row lens unit is located directly above the center line of a interval region between the two adjacent sub-pixels of the second row sub-pixel.

Wherein the display control unit acquires 2N viewpoint images, the first group of the viewpoint images and the second group of the viewpoint images respectively comprise N viewpoint images, N is a positive integer equal to or greater than 2.

Wherein the grating lens further comprises a first black matrix, the first black matrix is disposed on the boundary line between the first row lens unit and the second row lens unit along the row direction, in order to avoid the first group viewpoint image and the second group viewpoint image having the crosstalk along the column direction of the first row lens unit and the second lens unit.

Wherein the display panel further comprises a second black matrix, the second black matrix is disposed on the boundary line between the first row sub-pixel and the second row sub-pixel along the row direction, the first black matrix and the second black matrix overlap each other.

Wherein the gating lens is a liquid crystal lens, and comprising a plurality of driving electrodes periodically arranged in the row direction, each driving electrode comprises a first sub-electrode extending along the column direction and corresponding to the lens unit of the first row lens unit, a second sub-electrode extending along the column direction and corresponding to the lens unit of the second row lens unit, and a third sub-electrode connecting with the adjacent end of the first sub-electrode and the second sub-electrode along the row direction, wherein the first sub-electrode and the second sub-electrode of the same driving electrode are staggered from each other along the row direction, and the staggered amount is less than one sub-pixel cycle.

In order to solve the above technical problems, the present invention provides a manufacturing method of the stereoscopic display device, which comprises:

Acquiring a plurality of viewpoint images, and dividing the plurality of viewpoint images into a first group viewpoint image and a second group viewpoint image;

Controlling the first row sub-pixel of the display panel periodically to display the content of each viewpoint image in the first viewpoint image, and controlling the second row sub-pixel of the display panel periodically to display the content of each viewpoint image in the first viewpoint image;

Controlling the grating lens to form the first row lens unit covered on the first row sub-pixel, and controlling the grating lens to form the second row lens unit covered on the second row sub-pixel, wherein each lens unit of the firs row lens unit corresponds to a display cycle of the first row sub-pixel, each lens unit of the second row lens unit corresponds to a display cycle of the second row sub-pixel, the lens unit of the firs row lens unit and the lens unit of the second row lens unit are stagger each other along the row direction, and the staggered amount is less than one sub-pixel cycle.

Wherein the step of Controlling the grating lens to form the first row lens unit covered on the first row sub-pixel, and controlling the grating lens to form the second row lens unit covered on the second row sub-pixel comprises:

Controlling the lens unit of first row lens unit and the lens unit of the second row lens unit staggered a half cycle of the sub-pixel from each other along the row direction.

Wherein the step of acquiring a plurality of viewpoint images, and dividing the plurality of viewpoint images into a first group viewpoint image and a second group viewpoint image comprises:

Acquiring 2N viewpoint images, and dividing the 2N viewpoint images into the first group viewpoint image and the second group viewpoint image, which respectively comprise N viewpoint images, N is a positive integer equal to or greater than 2.

Through the above solutions, the benefits of the present invention is: the display panel comprises a first row sub-pixel and a second row sub-pixel adjacently disposed in the column direction, the first row sub-pixel and the second row sub-pixel respectively comprise a plurality of sub-pixels periodically arranged in the row direction; the display control unit acquires a plurality of viewpoint images and divides the plurality viewpoint images into a first group viewpoint image and a second group viewpoint image, the display control unit further controls the first row sub-pixel to periodically display the content of each viewpoint image in the first group viewpoint image, and controls the second row sub-pixel to periodically display the content of each viewpoint image in the second group viewpoint image; the grating lens comprises a first row lens unit and a second row lens unit adjacently disposed in the column direction, the first row lens unit and the second row lens unit respectively comprise a plurality of lens units periodically arranged along the row direction, the first row lens unit covers on the first row sub-pixel, and the arranging cycle of the lens unit in the first row lens unit is in accordance with the display cycle of the first row sub-pixel, the second row lens unit covers on the second row sub-pixel, and the arranging cycle of the lens unit in the second row lens unit is in accordance with the display cycle of the second row sub-pixel, wherein the lens unit of the first row lens unit and the lens unit of the second row lens unit are staggered from each other along the row direction, and the staggered amount is less than one sub-pixel cycle, which can eliminate the moiré and can solve the crosstalk between each adjacent pixel unit.

DETAILED DESCRIPTION OF THE PREFERRED EMBODIMENTS

Figure 2:
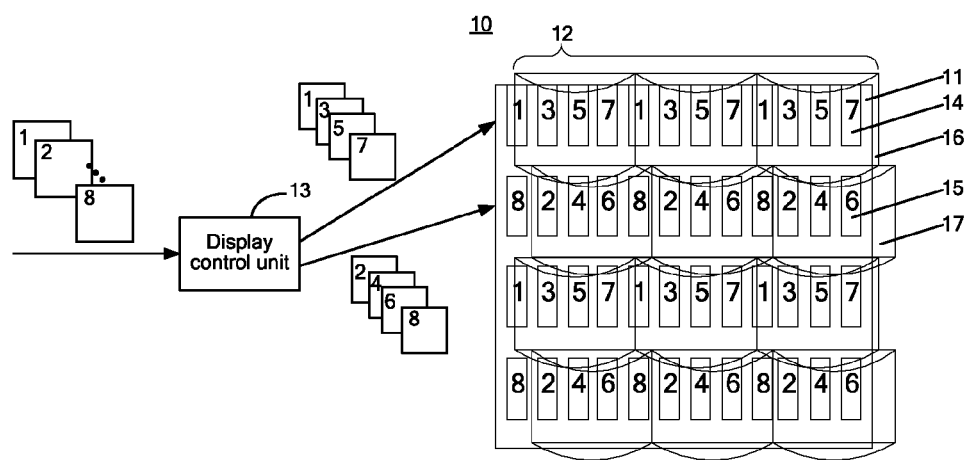
FIG. 2 is a structure diagram of a stereoscopic display device in the first embodiment of the present invention.

Please refer to FIG. 2, FIG. 2 is a structure diagram of a stereoscopic display device in the first embodiment of the present invention. As shown in FIG. 2, the stereoscopic display device 10 comprises a display panel 11, a grating lens 12 and a display control unit 13. The display panel 11 comprises a first row sub-pixel 14 and a second row sub-pixel 15 adjacently disposed in the column direction. The first row sub-pixel 14 and the second sub-pixel 15 respectively comprises a plurality of sub-pixels periodically arranged in the row direction. The display control unit 13 acquires a plurality of viewpoint images, and dividing the plurality of viewpoint images into a first group viewpoint image and a second group viewpoint image. The display control unit 13 further controls the first row sub-pixel 13 to periodically display the content of each viewpoint image in the first group viewpoint image, and controls the second row sub-pixel 15 to periodically display the content of each viewpoint image in the second group viewpoint image. The grating lens 12 comprises a first row lens unit 16 and a second row lens unit 17 adjacently disposed in the column direction. The first row lens unit 16 and the second row lens unit 17 respectively comprise a plurality of lens units periodically arranged in the row direction. The first row lens unit 16 covers on the first row sub-pixel 14, and the arranging cycle of the lens unit of the first row lens unit 16 is consistent with the display cycle of the first row sub-pixel 14. The second row lens unit 17 covers on the second row sub-pixel 15, and the arranging cycle of the lens unit of the second row lens unit 17 is consistent with the display cycle of the second row sub-pixel 16, wherein the lens unit of the first row lens unit 16 and the lens unit of the second row lens unit 17 are stagger each other along the row direction, and the staggered amount is less than a sub-pixel cycle.

Through the setting ways of the grating lens 12 in the stereoscopic display device 10 mentioned in the above configuration, it forms a deviation between the pixel structure of the display panel 11 and the grating lens 12, avoiding the grating lens 12 and the pixel structure of the display panel 11 entirely coincident or parallel produced periodic beat issue, thereby eliminating the moiré in the stereoscopic display, achieving the purpose of optimization visualization.

Specifically, the display control unit 13 acquires 2N viewpoint images, the first group of the viewpoint images and the second group of the viewpoint images respectively comprise N viewpoint images, N is a positive integer equal to or greater than 2. In the embodiment of the present invention, take 8 viewpoints for example, the display control unit 13 divides the acquired 8 viewpoint images of which the number is 1, 2, 3, 4, 5, 6, 7, 8 into a first viewpoint image (the number is 1, 3, 5, 7) and a second viewpoint image (the number is 2, 4, 6, 8), and controls the first row sub-pixel 14 to periodically display the content of each viewpoint image in the second group viewpoint image. Because the first row lens unit 16 covers on the first row sub-pixel 14, the second row lens unit 17 covers on the second row sub-pixel 15, and the lens unit of the first row lens unit 16 and the lens unit of the second row lens unit 17 are stagger each other along the row direction, and the staggered amount is less than a sub-pixel cycle; preferably, the lens unit of the first row lens unit 16 and the lens unit of the second row lens unit 17 are staggered half sub-pixel cycle each other in the row direction.

Figure 1:
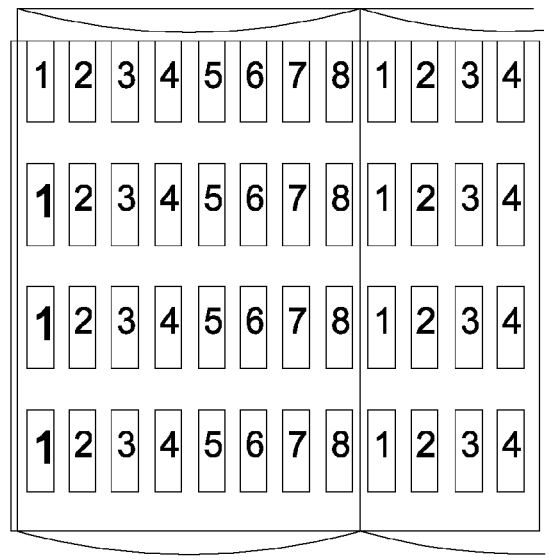
FIG. 1 is a structure diagram of a stereoscopic display device in the prior art.
Figure 3:
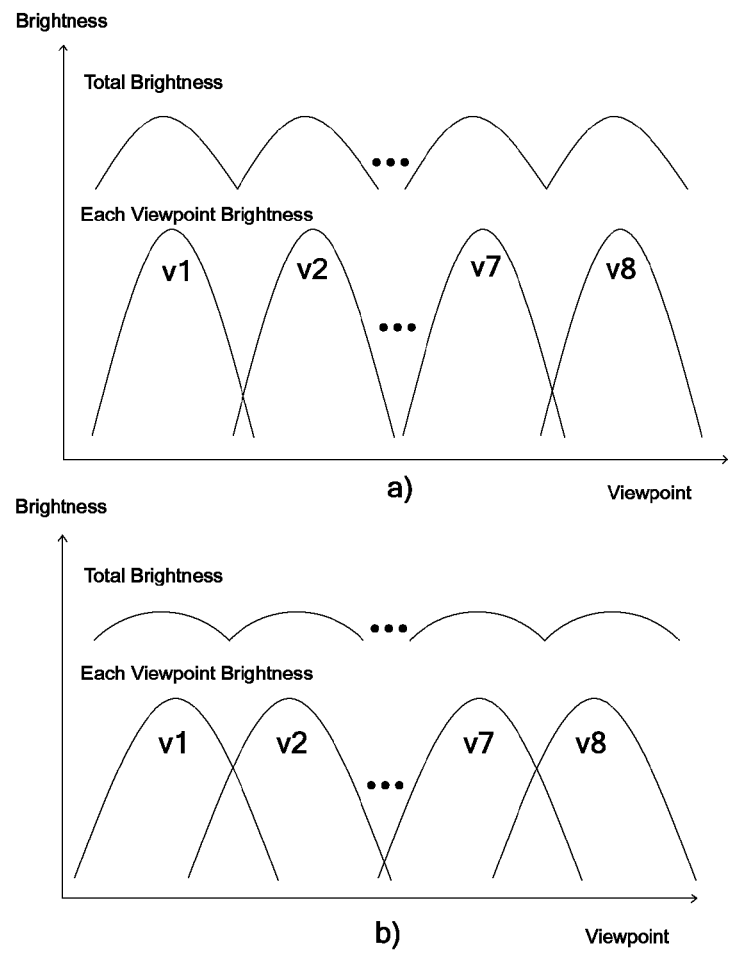
FIG. 3 is a brightness distribution diagram of a stereoscopic display device in the first embodiment of the present invention.

In the present embodiment, the outer edge of the lens unit of the first row lens unit 16 is located directly above the center line of the sub-pixel of the first row sub-pixel 14, the outer edge of the lens unit of the second row lens unit 17 is located directly above the center line of a interval region between the two adjacent sub-pixels of the second row sub-pixel 15. Specifically, as shown in FIG. 2, the distance between the sub-pixel 1 and the outer edge of the grating lens 12 is ½ distance of the sub-pixel, the distance between the sub-pixel 2 and the outer edge of the grating lens 12 is 1 distance of the sub-pixel, the distance between the sub-pixel 3 and the outer edge of the grating lens 12 is 1.5 distance of the sub-pixel, the distance between the sub-pixel 4 and the outer edge of the grating lens 12 is 2 distance of the sub-pixel, the distance between the sub-pixel 5 and the outer edge of the grating lens 12 is 2.5 distance of the sub-pixel, the distance between the sub-pixel 6 and the outer edge of the grating lens 12 is 3 distance of the sub-pixel, the distance between the sub-pixel 7 and the outer edge of the grating lens 12 is 3.5 distance of the sub-pixel, the distance between the sub-pixel 8 and the outer edge of the grating lens 12 is 4 distance of the sub-pixel. The brightness distribution is shown in FIG. 3, wherein Figure a is a brightness distribution diagram of 8 viewpoints corresponded by a stereoscopic display device in FIG. 1, Figure b is a brightness distribution diagram of 8 viewpoints corresponded by a stereoscopic display device in FIG. 2. It can be seen that, in Figure a, the resolution remains unchanged in the column direction, and the resolution sacrifices seriously in the row direction, it becomes ⅛ original resolution. In Figure b, the resolution sacrifices ½ in the row direction, and the resolution sacrifices ¼ in the column direction, the resolution relatively matches in the row direction and the column direction.

Figure 4:
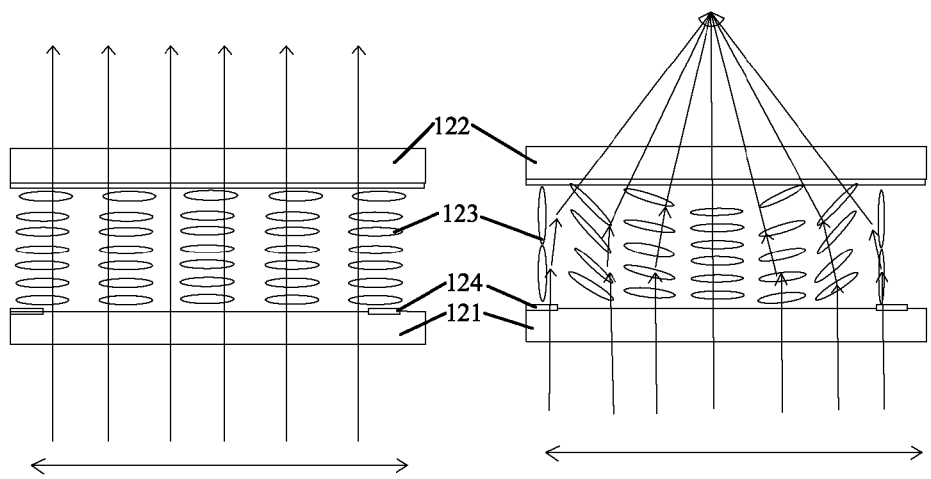
FIG. 4 is a structure diagram of a grating lens in a stereoscopic display device in the first embodiment of the present invention.

FIG. 4 is a structure diagram of a grating lens in a stereoscopic display device in the first embodiment of the present invention. As shown in FIG. 4, the grating lens 12 comprises a first substrate 121, a second substrate 122 and a liquid crystal molecules 123 disposed between the first substrate 121 and the second substrate 122. On the off-state in Figure a, the reflective index of all liquid crystal molecules 123 is the same, the parallel light directly passes through the liquid crystal molecules 123 not occurring the reflection. On the on-state in Figure b, the liquid crystal molecules 123 is shifted by the electric field between the first substrate 121 and the second substrate 122, the parallel light occurs reflection when passing through the liquid crystal molecules 123, the refection index of different liquid crystal molecules 123 could be different, the different parallel light occurs aggregation after passing the different optical path; meanwhile, the liquid crystal molecules 123 forms the grating lens to apply to the stereoscopic display.

Figure 5:
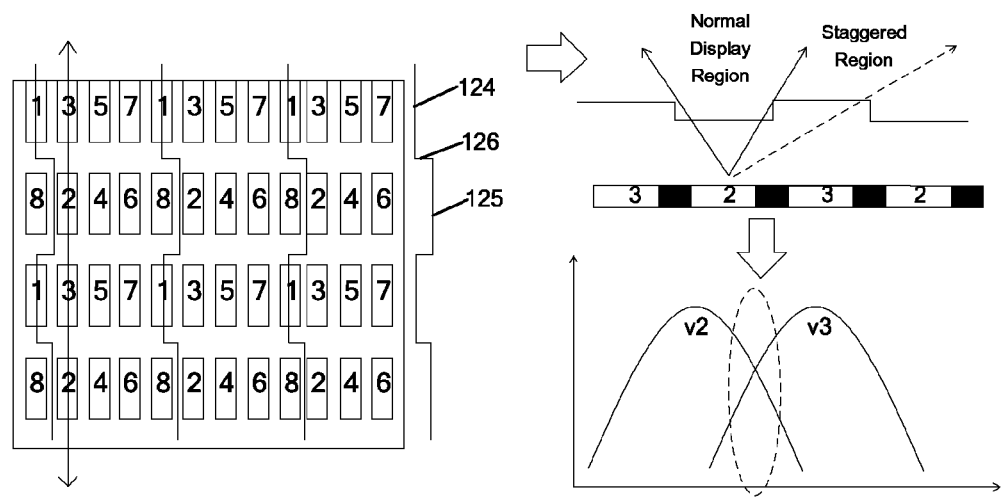
FIG. 5 is a schematic diagram of an electrode structure in a stereoscopic display device in the first embodiment of the present invention.

As shown in FIG. 5, the grating lens 12 is liquid crystal lens, which comprise a plurality of driving electrodes periodically arranged in the row direction, each driving electrode comprises a first sub-electrode 124 of the lens unit in the first row lens unit 16 corresponded and extended in the column direction, a second sub-electrode 125 of the lens unit in the second ken unit 17 corresponded and extended in the column direction and a third sub-electrode 126 connected with the adjacent end of the first sub-electrode 124 and the second sub-electrode 125 in the row direction, wherein the first sub-pixel 124 and the second sub-pixel 125 of the same driving electrode are staggered each other in the row direction, and the staggered amount is less than one sub-pixel cycle. After applying an electric field between the first substrate 121 and the second substrate 122, the liquid crystal molecules 123 will cause deflection according to the change of the electric field, thereby forming the desired lens effect. The display content as shown by the arrow is shown on the right, the light emitted from a viewpoint will cause crosstalk to the near viewpoint, resulting the crosstalk of the viewpoint, for example, the light emitted from the viewpoint v2 will cause crosstalk to the display region of the viewpoint v3, resulting the crosstalk of the viewpoint v3, thus will cause the narrowed viewing angel in the column direction.

Figure 6:
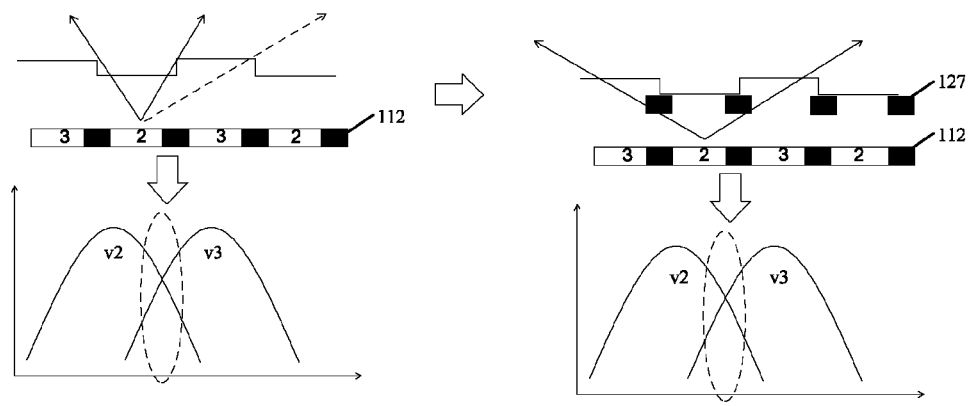
FIG. 6 is a structure diagram of a stereoscopic display device in the second embodiment of the present invention.
Figure 7:
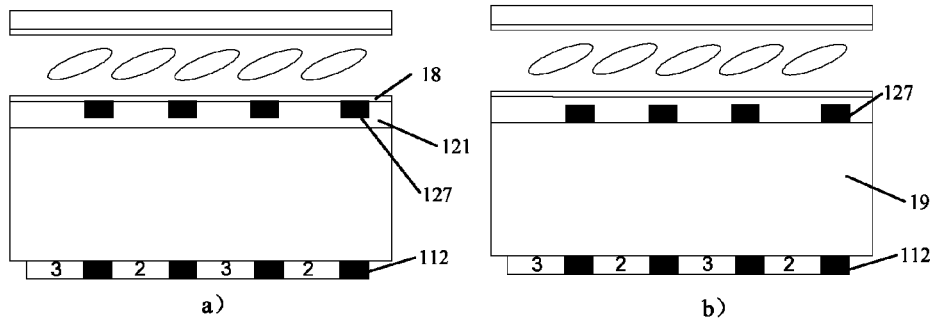
FIG. 7 is a structure diagram of a stereoscopic display device in the third embodiment of the present invention.

As shown in FIG. 6, the grating lens 12 also comprises a black matrix 127, the black matrix 127 is disposed on the boundary line between the first lens unit 16 and the second lens unit 17 along the row direction, in order to avoid the first group viewpoint image and the second group viewpoint image having the crosstalk along the column direction of the first row lens unit 16 and the second lens unit 17. The display panel 11 further comprises a second black matrix 112, the second black matrix 112 is disposed on the boundary line between the first row sub-pixel 14 and the second row sub-pixel 15 along the row direction, the first black matrix 127 and the second black matrix 112 overlap each other. Comparing to right and left, the crosstalk light formed by the viewpoint v2 is blocked by the black matrix 127. Therefore, through the way of increasing a black matrix 127 under the grating lens, it can reduce the crosstalk of each viewpoint in the column direction, thereby increasing the viewing angle in the column direction. The first black matrix 127 can be manufactured on the first substrate 121, as shown in Figure a in FIG. 7, manufacturing the first black matrix 127 on the first substrate 121, and then manufacturing the electrode picture 18 comprising a first electrode 124, a second electrode 125 and a third electrode 126 on the first black matrix 127. The first black matrix 127 also can be manufactured on the back of the first substrate 121 or on the surface of the gap glass 19, as shown in Figure b in FIG. 7. Whether the first black matrix 127 is manufactured on the first substrate 121 or on the back of the first substrate 121, the first black matrix 127 and the second black matrix 11 are staggered each other in the row direction, in order to insure the first black matrix can not be seen. Through the above structure, it does not only eliminate the moiré, but also solve the crosstalk issue between the adjacent pixel units.

Figure 8:
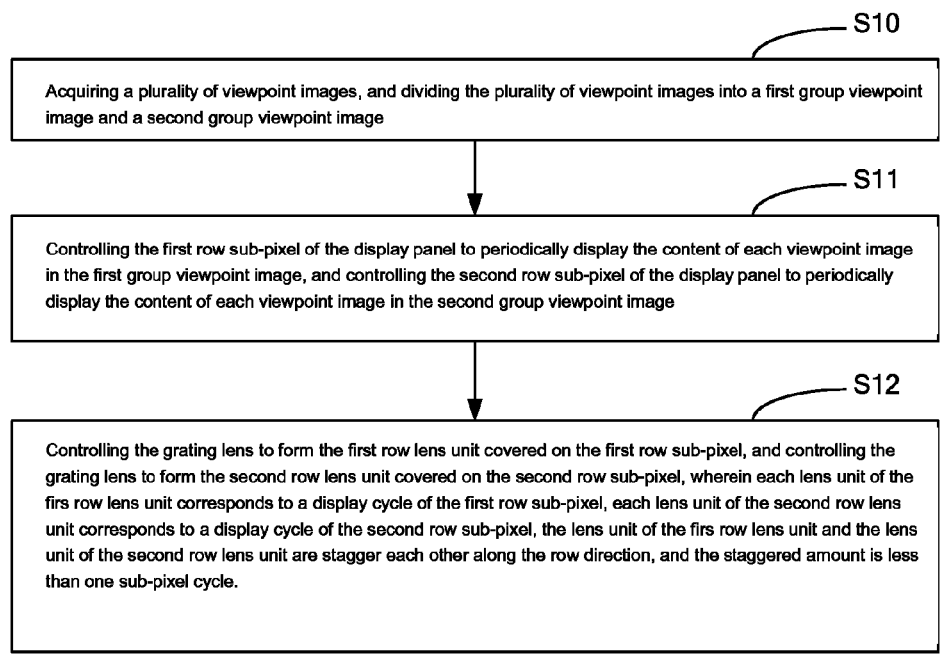
FIG. 8 is a flow chart of a control method of a stereoscopic in the first embodiment of the present invention.

Please refer to FIG. 8, FIG. 8 is a flow chart of a control method of a stereoscopic in the first embodiment of the present invention. As shown in FIG. 8, the control method of the stereoscopic display device comprises:

Step S10: acquiring a plurality of viewpoint images, and dividing the plurality of viewpoint images into a first group viewpoint image and a second group viewpoint image.

In S10, acquiring 2N viewpoint images, and dividing the 2N viewpoint images into the first group viewpoint image and the second group viewpoint image, which respectively comprise N viewpoint images, N is a positive integer equal to or greater than 2.

Step S11: controlling the first row sub-pixel of the display panel periodically to display the content of each viewpoint image in the first viewpoint image, and controlling the second row sub-pixel of the display panel periodically to display the content of each viewpoint image in the first viewpoint image.

Step S12: Controlling the grating lens to form the first row lens unit covered on the first row sub-pixel, and controlling the grating lens to form the second row lens unit covered on the second row sub-pixel, wherein each lens unit of the firs row lens unit corresponds to a display cycle of the first row sub-pixel, each lens unit of the second row lens unit corresponds to a display cycle of the second row sub-pixel, the lens unit of the firs row lens unit and the lens unit of the second row lens unit are stagger each other along the row direction, and the staggered amount is less than one sub-pixel cycle.

Specifically, in step S12, controlling the lens unit of first row lens unit and the lens unit of the second row lens unit staggered a half cycle of the sub-pixel from each other along the row direction. Making the pixel structure of the display panel and the disposing way of the grating lens to form deviation, avoiding the grating lens and the pixel structure of the display panel entirely coincident or parallel produced periodic beat issue, thereby eliminating the moiré in the stereoscopic display, achieving the purpose of optimization visualization.

In the present embodiment, the gating lens is a liquid crystal lens, and comprising a plurality of driving electrodes periodically arranged in the row direction, each driving electrode comprises a first sub-electrode extending along the column direction and corresponding to the lens unit of the first row lens unit, a second sub-electrode extending along the column direction and corresponding to the lens unit of the second row lens unit, and a third sub-electrode connecting with the adjacent end of the first sub-electrode and the second sub-electrode along the row direction, wherein the first sub-electrode and the second sub-electrode of the same driving electrode are staggered from each other along the row direction, and the staggered amount is less than one sub-pixel cycle. After applying the electric field between the first substrate and the second substrate, the liquid crystal molecules will cause deflection according to the change of the electric field, thereby forming the desired lens effect. Along the column direction, the light emitted from a viewpoint will cause crosstalk to the near viewpoint, causing the narrowed viewing angle in the column direction. In order to avoid the crosstalk, providing the first black matrix on the boundary line between the first row lens unit and the second lens unit along the row direction. The first black matrix can avoid the first group viewpoint image and the second group viewpoint image having the crosstalk along the column direction of the first row lens unit and the second lens unit, thereby increasing the viewing angle in the column direction. The first black matrix can be manufactured on the first substrate, manufacturing the first black matrix on the first substrate, and then manufacturing the electrode picture comprising a first electrode, a second electrode and a third electrode on the first black matrix. The first black matrix also can be manufactured on the back of the first substrate or on the surface of the gap glass. Whether the first black matrix is manufactured on the first substrate or on the back of the first substrate, the first black matrix and the second black matrix are staggered each other in the row direction, in order to insure the first black matrix can not be seen. Through the above structure, it does not only eliminate the moiré, but also solve the crosstalk issue between the adjacent pixel units.

In summary, the present invention through the display panel comprising a first row sub-pixel and a second row sub-pixel adjacently disposed in the column direction, the first row sub-pixel and the second row sub-pixel respectively comprise a plurality of sub-pixels periodically arranged in the row direction; the display control unit acquires a plurality of viewpoint images and divides the plurality viewpoint images into a first group viewpoint image and a second group viewpoint image, the display control unit further controls the first row sub-pixel to periodically display the content of each viewpoint image in the first group viewpoint image, and controls the second row sub-pixel to periodically display the content of each viewpoint image in the second group viewpoint image; the grating lens comprises a first row lens unit and a second row lens unit adjacently disposed in the column direction, the first row lens unit and the second row lens unit respectively comprise a plurality of lens units periodically arranged along the row direction, the first row lens unit covers on the first row sub-pixel, and the arranging cycle of the lens unit in the first row lens unit is in accordance with the display cycle of the first row sub-pixel, the second row lens unit covers on the second row sub-pixel, and the arranging cycle of the lens unit in the second row lens unit is in accordance with the display cycle of the second row sub-pixel, wherein the lens unit of the first row lens unit and the lens unit of the second row lens unit are staggered from each other along the row direction, and the staggered amount is less than one sub-pixel cycle, which can eliminate the moiré and can solve the crosstalk between each adjacent pixel unit.

The preferred embodiments according to the present invention are mentioned above, which cannot be used to define the scope of the right of the present invention. Those variations of equivalent structure or equivalent process according to the present specification and the drawings or directly or indirectly applied in other areas of technology are considered encompassed in the scope of protection defined by the clams of the present invention.

What is claimed is:

1. A stereoscopic display device, wherein the stereoscopic display device comprises:
    A display panel, the display panel comprising a first row sub-pixel and a second row sub-pixel adjacently disposed in the column direction, the first row sub-pixel and the second row sub-pixel respectively comprising a plurality of sub-pixels periodically arranged along the row direction;
    A display control unit, the display control unit acquiring a plurality of viewpoint images, and the plurality of viewpoint images viewpoint image being divided into a first group of viewpoint image and a second group of viewpoint image, the display control unit further controlling the first row sub-pixel to display the contents of each viewpoint image in the first group of viewpoint image, and controlling the second row sub-pixel to display the contents of each viewpoint image in the second group of viewpoint image;
    A grating lens, the grating lens comprising a first row lens unit and a second row lens unit adjacently disposed in the column direction, the first row lens unit and the second row lens unit respectively comprising a plurality of lens units periodically arranged along the row direction, the first row lens unit covering on the first row sub-pixel, and the arranging cycle of the lens unit in the first row lens unit being in accordance with the display cycle of the first row sub-pixel, the second row lens unit covering on the second row sub-pixel, and the arranging cycle of the lens unit in the second row lens unit being in accordance with the display cycle of the second row sub-pixel, wherein the lens unit of the first row lens unit and the lens unit of the second row lens unit are staggered from each other along the row direction, and the staggered amount is less than one sub-pixel cycle;
    Wherein the lens unit of first row lens unit and the lens unit of the second row lens unit are staggered a half cycle of the sub-pixel from each other along the row direction; the gating lens is a liquid crystal lens, and comprising a plurality of driving electrodes periodically arranged in the row direction, each driving electrode comprises a first sub-electrode extending along the column direction and corresponding to the lens unit of the first row lens unit, a second sub-electrode extending along the column direction and corresponding to the lens unit of the second row lens unit, and a third sub-electrode connecting with the adjacent end of the first sub-electrode and the second sub-electrode along the row direction, wherein the first sub-electrode and the second sub-electrode of the same driving electrode are staggered from each other along the row direction, and the staggered amount is less than one sub-pixel cycle.

2. The device as claimed in claim 1, wherein the outer edge of the lens unit of the first row lens unit is located directly above the center line of the sub-pixel of the first row sub-pixel, the outer edge of the lens unit of the second row lens unit is located directly above the center line of a interval region between the two adjacent sub-pixels of the second row sub-pixel.

3. The device as claimed in claim 1, wherein the display control unit acquires 2N viewpoint images, the first group of the viewpoint images and the second group of the viewpoint images respectively comprise N viewpoint images, N is a positive integer equal to or greater than 2.

4. The device as claimed in claim 3, wherein the grating lens further comprises a first black matrix, the first black matrix is disposed on the boundary line between the first row lens unit and the second row lens unit along the row direction, in order to avoid the first group viewpoint image and the second group viewpoint image having the crosstalk along the column direction of the first row lens unit and the second lens unit.

5. The device as claimed in claim 4, wherein the display panel further comprises a second black matrix, the second black matrix is disposed on the boundary line between the first row sub-pixel and the second row sub-pixel along the row direction, the first black matrix and the second black matrix overlap each other.

6. A stereoscopic display device, wherein the stereoscopic display device comprises:
    A display panel, the display panel comprising a first row sub-pixel and a second row sub-pixel adjacently disposed in the column direction, the first row sub-pixel and the second row sub-pixel respectively comprising a plurality of sub-pixels periodically arranged along the row direction;
    A display control unit, the display control unit acquiring a plurality of viewpoint images, and the plurality of viewpoint images viewpoint image being divided into a first group of viewpoint image and a second group of viewpoint image, the display control unit further controlling the first row sub-pixel to display the contents of each viewpoint image in the first group of viewpoint image, and controlling the second row sub-pixel to display the contents of each viewpoint image in the second group of viewpoint image;

A grating lens, the grating lens comprising a first row lens unit and a second row lens unit adjacently disposed in the column direction, the first row lens unit and the second row lens unit respectively comprising a plurality of lens units periodically arranged along the row direction, the first row lens unit covering on the first row sub-pixel, and the arranging cycle of the lens unit in the first row lens unit being in accordance with the display cycle of the first row sub-pixel, the second row lens unit covering on the second row sub-pixel, and the arranging cycle of the lens unit in the second row lens unit being in accordance with the display cycle of the second row sub-pixel, wherein the lens unit of the first row lens unit and the lens unit of the second row lens unit are staggered from each other along the row direction, and the staggered amount is less than one sub-pixel cycle.

7. The device as claimed in claim 6, wherein the lens unit of first row lens unit and the lens unit of the second row lens unit are staggered a half cycle of the sub-pixel from each other along the row direction.

8. The device as claimed in claim 7, wherein the outer edge of the lens unit of the first row lens unit is located directly above the center line of the sub-pixel of the first row sub-pixel, the outer edge of the lens unit of the second row lens unit is located directly above the center line of a interval region between the two adjacent sub-pixels of the second row sub-pixel.

9. The device as claimed in claim 6, wherein the display control unit acquires 2N viewpoint images, the first group of the viewpoint images and the second group of the viewpoint images respectively comprise N viewpoint images, N is a positive integer equal to or greater than 2.

10. The device as claimed in claim 9, wherein the grating lens further comprises a first black matrix, the first black matrix is disposed on the boundary line between the first row lens unit and the second row lens unit along the row direction, in order to avoid the first group viewpoint image and the second group viewpoint image having the crosstalk along the column direction of the first row lens unit and the second lens unit.

11. The device as claimed in claim 10, wherein the display panel further comprises a second black matrix, the second black matrix is disposed on the boundary line between the first row sub-pixel and the second row sub-pixel along the row direction, the first black matrix and the second black matrix overlap each other.

12. The device as claimed in claim 6, wherein the gating lens is a liquid crystal lens, and comprising a plurality of driving electrodes periodically arranged in the row direction, each driving electrode comprises a first sub-electrode extending along the column direction and corresponding to the lens unit of the first row lens unit, a second sub-electrode extending along the column direction and corresponding to the lens unit of the second row lens unit, and a third sub-electrode connecting with the adjacent end of the first sub-electrode and the second sub-electrode along the row direction, wherein the first sub-electrode and the second sub-electrode of the same driving electrode are staggered from each other along the row direction, and the staggered amount is less than one sub-pixel cycle.

13. A control method of a stereoscopic display device, wherein the control method comprises:
Acquiring a plurality of viewpoint images, and dividing the plurality of viewpoint images into a first group viewpoint image and a second group viewpoint image;
Controlling the first row sub-pixel of the display panel periodically to display the content of each viewpoint image in the first viewpoint image, and controlling the second row sub-pixel of the display panel periodically to display the content of each viewpoint image in the first viewpoint image;
Controlling the grating lens to form the first row lens unit covered on the first row sub-pixel, and controlling the grating lens to form the second row lens unit covered on the second row sub-pixel, wherein each lens unit of the firs row lens unit corresponds to a display cycle of the first row sub-pixel, each lens unit of the second row lens unit corresponds to a display cycle of the second row sub-pixel, the lens unit of the firs row lens unit and the lens unit of the second row lens unit are stagger each other along the row direction, and the staggered amount is less than one sub-pixel cycle.

14. The method as claimed in claim 13, wherein the step of Controlling the grating lens to form the first row lens unit covered on the first row sub-pixel, and controlling the grating lens to form the second row lens unit covered on the second row sub-pixel comprises:
Controlling the lens unit of first row lens unit and the lens unit of the second row lens unit staggered a half cycle of the sub-pixel from each other along the row direction.

15. The method as claimed in claim 13, wherein the step of acquiring a plurality of viewpoint images, and dividing the plurality of viewpoint images into a first group viewpoint image and a second group viewpoint image comprises:
Acquiring 2N viewpoint images, and dividing the 2N viewpoint images into the first group viewpoint image and the second group viewpoint image, which respectively comprise N viewpoint images, N is a positive integer equal to or greater than 2.

* * * * *